United States Patent [19]
Maxwell, Jr. et al.

[11] 3,977,625
[45] Aug. 31, 1976

[54] RELEASABLE TAPE CARTRIDGE MOUNTING

[75] Inventors: Albert H. Maxwell, Jr., Raleigh; Herman Q. Wilson, Clayton, both of N.C.

[73] Assignee: Westinghouse Electric Corporation, Pittsburgh, Pa.

[22] Filed: Sept. 23, 1975

[21] Appl. No.: 615,861

[52] U.S. Cl. .................................. 242/198; 360/93
[51] Int. Cl.² .................. G03B 1/04; G11B 15/32; G11B 23/04
[58] Field of Search .................. 242/197–200; 360/71–74, 90–96

[56] References Cited
UNITED STATES PATENTS

| | | |
|---|---|---|
| 3,111,281 | 11/1963 | Sinkewitsch .................. 242/200 |
| 3,524,651 | 8/1970 | Ketzer .......................... 242/198 X |
| 3,594,008 | 7/1971 | Takagi et al. .................. 360/94 |
| 3,602,458 | 8/1971 | Doby et al. .................... 242/199 |

*Primary Examiner*—Leonard D. Christian
*Attorney, Agent, or Firm*—R. W. Smith

[57] ABSTRACT

Yieldable retainer assemblies are symmetrically positioned on a tape deck and include rounded contact surfaces for engaging the outer side of a tape cartridge and clamping it against a base plate. A pair of locating posts extend from the plate through locator holes in the bottom side of the cartridge to retain the cartridge in a predetermined playing position. A pair of driving hubs of a reel driver assembly have resiliently shiftable pins carried by the hubs for self-adjusting fitting into holes of driven hubs of the cartridge reels when slight misalignment occurs between the driving and reel hubs.

8 Claims, 3 Drawing Figures

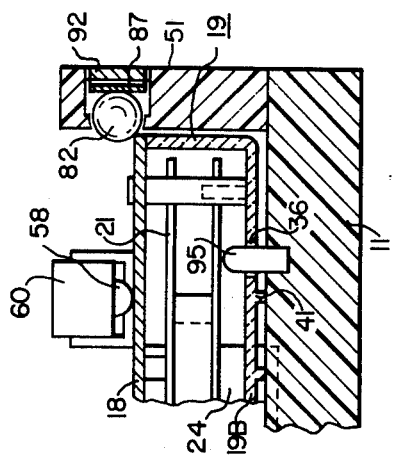
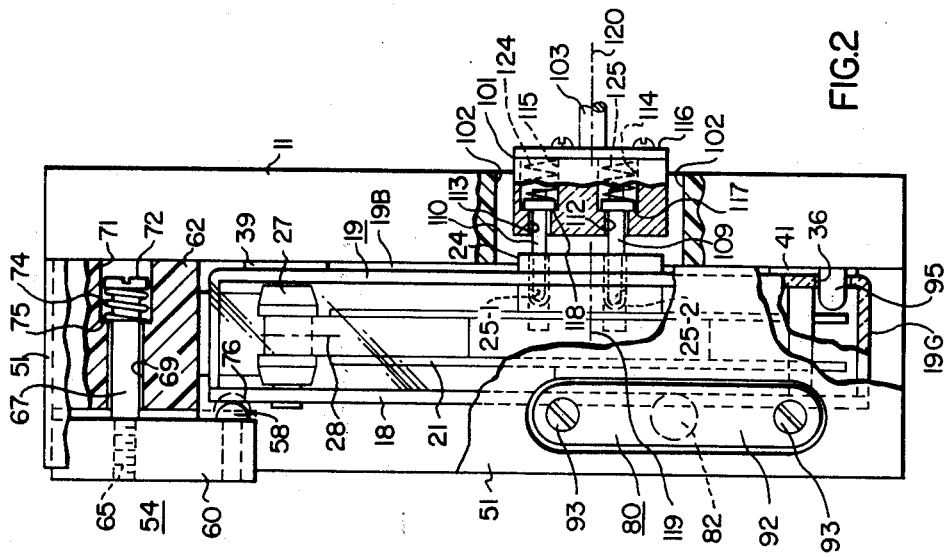

RELEASABLE TAPE CARTRIDGE MOUNTING

CROSS-REFERENCE TO RELATED PATENTS

The present invention is related to U.S. Pat. No. 3,602,458, issued to W. P. Doby et al., Aug. 31, 1971, for a Tape Recorder Having A Tape Cartridge, and assigned to the assignee of this invention.

BACKGROUND OF THE INVENTION

This invention relates to releasable tape cartridge mounting arrangements and more particularly to an improved tape cartridge mounting for mounting a tape cartridge in a vertical orientation and retaining the cartridge in predetermined alignment with the tape driving and transducer portions of a tape deck.

A tape cartridge unit and a releasable cartridge mounting is described in U.S. Pat. No. 3,602,458 issued to W. P. Doby et al., Aug. 31, 1971, and assigned to the assignee of this invention, and the present invention is directed to a releasable mounting for the cartridge unit described in the aforementioned patent. The cartridge unit is held in the cartridge mounting of the aforementioned patent by an outer plate that overlaps the upper forward portion of the cartridge along the open end thereof. A pair of leaf springs carried by the cartridge engage the overlapping outer plate to hold the cartridge against a base plate supporting the bottom of the cartridge. A pair of notched posts fit through locator holes in the rear bottom of the cartridge to support the cartridge vertically and hold the rear bottom part of the cartridge against the base plate. A pair of flat plates extend adjacent the side of the cartridge to guide the cartridge into the proper position during insertion and retain the lateral positioning of the cartridge upon final insertion. Reel driving hubs of the tape drive assembly include pins which are received within complementary shaped holes of the driven hubs of the supply and take-up reels.

While the aforementioned arrangement is satisfactory, it has been found that in some instances variations in manufacturing causes slight misalignment of the mating parts of the tape deck mounting arrangements and the cartridge. For example, if the cartridge is not held flush with the base plate of the mounting arrangement, there is a misalignment between the center line of the tape and the magnetic transducer head causing improper or incomplete transfer of information between the transducer head and plural recording tracks of the tape. Further, the driver pins of the driving hub may not be properly aligned for fitting within the driven reel hubs which may cause one of the reels to be drivingly engaged while the other is not. Spillage of tape occurs as one of the reels is driven while the other is not. It is also important that the mounting arrangement permit free and quick insertion of the cartridge into the mounting so that it immediately assumes the correct aligned orientation without additional correction or extensive inspection. The cartridges are often inserted and removed continuously during daily work periods in data processing apparatus handling the cartridges.

SUMMARY OF THE INVENTION

In accordance with the present invention an improved releasable tape cartridge mounting is provided for receiving and retaining a tape cartridge on a base plate of a tape deck. A pair of side guide plates extend immediately adjacent the sides of the cartridge receiving space in facing relationship and a pair of cylindrical locating posts having rounded ends extend from the base for fitting within complementary locator holes at the bottom of the cartridge for supporting the cartridge in a predetermined vertical orientation. Forward yieldable retainer assemblies are provided at the forward and upper end of the tape deck. The forward retainer assemblies include arms that are resiliently biased and extend over the cartridge so they are forced outwardly by insertion of the tape cartridge. Rounded contact surfaces of the retainer assemblies engage and apply an inward pressure to the cartridge to hold it against the base plate. Rear yieldable retainer assemblies include catch members that are provided on the side guide plates near the rearward portion of the cartridge receiving space. Rounded contact surfaces of the catch members are resiliently biased outward to engage the outer corners of the cartridge to resiliently bias the cartridge against the base plate at a rearward end of the cartridge. A pair of locating posts fit within complementary locator holes of the cartridge in the bottom of the cartridge for supporting the cartridge in a vertical playing position. Thus inserted, the cartridge is positioned and retained so that proper alignment is provided between the tape medium, carried on the supply and take-up reels of the cartridge, and the magnetic transducer of the tape deck. A pair of reel driving hubs of a tape drive assembly of the tape deck include driver pins resiliently biased outward through the bottom of the base plate. The driver pins have a loose clearance fit within cylindrical bores provided in the driving hubs. Also, the driver pins have a loose clearance fitting within the holes of an associated driven hub of the cartridge reels to permit tilting of the driver pins so that the pins are easily self-aligned with the reel hub holes and are capable of transmitting high torques at high tape driving speeds.

Accordingly, it is a general feature of the present invention to provide an improved releasable tape cartridge mounting in which the cartridge is received by yieldable retainer assemblies each having a rounded contact surface for receiving and sliding over the upper portion of the cartridge with low sliding friction and thereafter resiliently biasing the cartridge against a base plate in a correct cartridge playing vertical orientation. Also, an important feature of the present invention is to provide a self-aligning coupling between the driving hubs of the tape drive assembly and the driven hubs of the cartridge reels so as to permit transmission of high rotational torques between the tape drive at high speeds when slight misalignments between the centers of the driven and driving hubs exist.

BRIEF DESCRIPTION OF THE DRAWINGS

FIG. 2 is a side elevational view of the tape deck and cartridge shown in FIG. 1 with parts broken away; and FIG. 3 is a sectional view of the lower right hand corner of FIG. 1 taken along the axis III—III and looking in the direction of the arrows.

DETAILED DESCRIPTION OF THE PREFERRED EMBODIMENT

Figure 1:
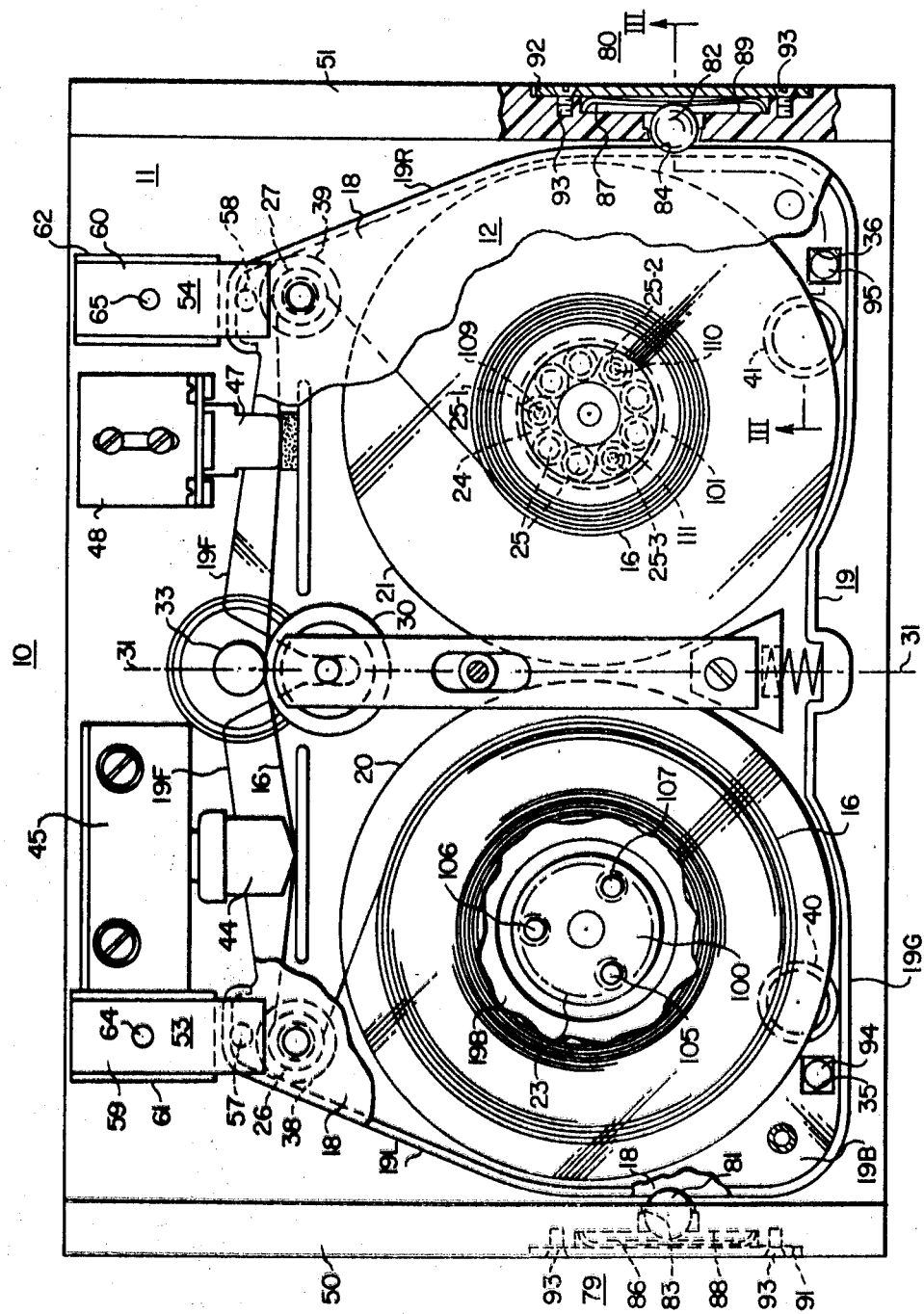
FIG. 1 is a front elevational view with parts broken away of a tape deck having an improved releasable cartridge mounting made in accordance with the present invention and having a tape having a tape cartridge mounted therein.

Referring now to the drawing and more particularly to FIGS. 1 and 2 there is shown a tape deck indicated generally by the numeral 10 having a base plate 11 mounted for extending in a substantially vertical plane and receiving a tape cartridge 12 and retaining the cartridge in accordance with the present invention. The tape cartridge 12 is disclosed and claimed in the aforementiond U.S. Pat. No. 3,602,458 and for purposes of understanding the present invention, the principal parts thereof are noted hereinafter.

The cartridge 12 carries a magnetic recording tape 16 in a housing including a metal outer plate 18, shown in the side view of FIG. 2 forming the upper cartridge side, to which the several parts of the cartridge are fastened. A plastic cover 19 completes the housing for the cartridge 12 and includes a bottom side 19B, right and left ends 19R and 19L (as viewed in FIG. 1), a rear end 19B and a partially open forward end 19F. A pair of tape reels 20 and 21, forming supply and take-up reels, are rotatably mounted to the upper plate 18 and include driven hubs 23, shown in broken lines, and 24, respectively, extending through the cover bottom 19B and driven by a tape drive assembly mounted behind the tape deck and partially described hereinbelow. Each of the driven reel hubs 23 and 24 include nine circumferentially disposed cylindrical bore holes open at the bottom of the cartridge 12. The cylindrical bore holes of the reel hub 24 are illustrated by the broken line circles designated by the numeral 25 with three of the holes, 25-1, 25-2 and 25-3 noted further hereinbelow. Two of the bores 25-1 and 25-2 of the reel hub 24 are shown in FIG. 2.

The tape 16 extends between the reels 20 and 21 as shown in FIG. 1 for movement in opposite directions around guide rollers 26 and 27 carried by the plate 18 at the forward end of the cartridge. The center line 28, shown in FIG. 2, of the guide rollers 26 and 27, and also of the tape 16 and its path is parallel to the base plate 11 of the tape deck 10 and it is important, as noted hereinbelow, that this center line 28 may be maintained at a centered position on the plate 11. A rubber pressure roller 30 in the cartridge is oriented on the center axis 31 of the tape cartridge and biases the tape 16 outward through the open forward end of the cover 19 and against the capstan 33 provided at the forward end of the tape deck 10 as shown in FIG. 1. The capstan is driven by a motor, not shown, included in the tape drive assembly mounted behind the base plate 11. The manner in which the pressure roller 30 is biased against the capstan 33 is not shown but is described in detail in the aforementioned U.S. Pat. No. 3,602,458.

The cartridge cover 19 fits against the outer plate 18 of the cartridge 12 as shown in FIG. 2 with the forward end of the cover being open to expose the tape 16 extending between the reels 20 and 21. Locator holes 35 and 36 in the cover 19 have an essentially square configuration are provided equal distances from the center axis 31 near the left and right cartridge ends 19L and 19R and adjacent the back end portion 19R of the plastic cover 19. The forward or uppermost side of the holes 35 and 36 provide a reference for positioning the forward end of the cartridge 11 relative the front parts of the tape deck 10 and the reels for driving engagement with tape drive assembly.

Reference pads 38, 39, 40 and 41 are formed by four raised ring or boss-like surfaces on the bottom side 19B of the cover 19. The reference pads 38 and 39 are equidistant from the center line 31 of the cartridge and are substantially concentric with the guide rollers 26 and 27 at the forward end of the cartridge. The reference pads 40 and 41 are equidistant from the center line 31 at the back end of the cover 19 inwardly adjacent the locator holes 35 and 36. The reference pads are important reference indexes for establishing that the tape cartridge is aligned in the cartridge mounting of the tape deck so that the tape is parallel at a fixed distance from the plate 11 and centered with tape sensing and transducing parts at the forward end of the tape deck.

Referring now in more detail to the general features of the tape deck 10 including the improved releasable cartridge mounting of this invention, the tape deck includes the base plate 11, noted hereinabove, which is mounted in a vertical plane. The tape deck is mounted in the preferred embodiment on a data translating apparatus operable as disclosed in U.S. Pat. No. 3,678,484, issued July 18, 1972 to A. H. Maxwell, Jr. for Reverse-Direction Tape Translation and is assigned to the assignee of this invention. The forward and upper area of the tape deck 10 includes a magnetic transducer head 44 that is carried on a mounting bracket 45. In the illustrated embodiment of the tape deck 10 the magnetic transducer performs a magnetic pickup operation for sensing data pulses provided on plural recording tracks of the magnetic tape 16. An end-of tape sensor 47 is mounted on a bracket 48 at the right-hand side of the capstan 33 as shown in FIG. 1. Side guide plates 50 and 51 extend vertically at the left-hand and right-hand sides of the base plate 11 in a parallel relationship and immediately adjacent the left-hand and right-hand sides of a cartridge receiving space that extends above a cartridge support area of the base plate 11 immediately under the peripheral outline of the cartridge 12 as shown in FIG. 1. The guide plates aid in aligning and guiding the cartridge 12 upon initial insertion into the tape deck and form part of the releasable cartridge mounting as described further hereinafter.

The releasable cartridge mounting provided in the tape deck 10 in accordance with the present invention is now described. Forward yieldable retainer assemblies 53 and 54 are equally spaced from the center line of the tape deck coinciding with the center line 31 and are positioned at the upper and forward end of the tape deck. A side plan view, with parts broken away, of the retainer 54 is shown in FIG. 2. Protrusions 57 and 58 having rounded spherical contact surfaces of the assemblies 53 and 54, respectively, project inwardly toward the base plate 11. Inwardly and outwardly movable arms 59 and 60 extend vertically in a cantilever projecting fashion and carry the protrusions 57 and 58, respectively, on the free ends thereof. Mounting posts 61 and 62 are fixedly attached to the base plate 11 to form fixed parts of the yieldable retaining assemblies 53 and 54. Stud members formed by shoulder screws 64 and 65 are threaded to the attaching end of the arms 59 and 60.

The details of the assembly 54 are shown in FIG. 2 which is described hereinafter in detail, it being understood that the assembly 53 is similarly constructed. The shoulder screw 65 includes an end shank portion 67 which is slidable within a cylindrical bore 69 of the mounting post 62. A counter bore portion aligned with the bore 69 receives the head 72 of the screw 65. A coil spring 74 is mounted around the shank 67 adjacent the inner side of the screw head 72 and extends to the shoulder 75 between the smaller bore 67 and counter bore 71.

Without the cartridge 12 being inserted in the tape reader, the coil spring 74 biases the arm 60 inwardly against the top of the mounting post to effect an inner position of the protrusion 58 as shown by the position indicated by the broken lines 76. Upon insertion of the cartridge 12 into the tape reader, the cartridge outer plate 18 engages the rounded contact surfaces of the protrusions 57 and 58 with a low sliding friction therewith. The arms 59 and 60 are raised outward against the resilient force of the coil spring 74 so that a resultant force on the arms is produced from compressing the spring. Accordingly, the arms 59 and 60 apply inward forces through the small point contact-like contact surfaces of the protrusions 57 and 58 at the upper and front portion of the cartridge 12 that are perpendicular to the base plate 11. These biasing forces will maintain the cartridge cover reference pads 38 and 39 against the base plate 11 and maintain the guide rollers and the tape 16 in centered alignment with the transducer head 44.

Rear yieldable retaining assemblies 79 and 80 are identical and are carried in facing relationship in the side guide plates 50 and 51. Catch members formed by metal balls 81 and 82, being spherical, provide rounded contact surfaces which are movable for engaging the outer side corners of the plate 18, as the ball 82 is shown engaging the corner of the plate 18 in FIG. 3. The balls 81 and 82 are carried in recessed portions of the plates including concave ring sockets 83 and 84 conforming to the balls and extending from facing openings extending into the inner sides of the guide plates. The sockets hold the balls 81 and 82 so that they are positioned outwardly from the facing sides of each guide plate to engage the corner of the cartridge outer plate 18 as noted hereinabove and are positioned toward a rearward portion of the cartridge receiving area to engage the cartridge 12 approximately one-fourth of the distance between the forward and rear ends of the cartridge. The balls 81 and 82 are biased against the sockets 83 and 84 by leaf springs 86 and 87 which are received within flat recess portions 88 and 89 extending behind the sockets 83 and 84. Plates 91 and 92 are held in place by screws 93 in a recessed mounting to be substantially flat with the outer side of the guide plates and retain the springs 86 and 87 and balls 81 and 82. The balls 81 and 82 are normally biased against the spherical ring sockets so as to be in interference clearance fitting relationship with the corners of the plate 18. The portion of the balls engaging the corners of the plate form a very low friction and yielding surfaces for permitting the cartridge to easily pass the balls. Rotational movement of the balls within the spherical ring sockets 83 and 84 further reduces frictional resistance to insertion of the cartridge.

The catch members or balls 81 and 82 exert both opposing lateral forces and inward or perpendicular forces toward the base plate 11 on the cartridge 12 to maintain the center line of the cartridge in alignment with the center line of the tape reader. The primary function of the balls 81 and 82 is to maintain the rear reference pads 40 and 41 flush against the base plate 11 when the cartridge is finally inserted as shown in the FIGS. 1, 2 and 3.

Another feature of the cartridge mounting of this invention includes cylindrical locating posts 94 and 95 provided at the rear portion of the tape reader extending outwardly from the base plate 11 in substantially equidistant relationship from the center line of the tape cartridge receiving area coinciding with the center line 31. The posts are positioned in predetermined referenced locations with respect to the tape driving and transducer portions of the tape deck 10. The circumferences of the posts have close-fitting relationship with the edges of the locater holes 35 and 36 in the bottom of the cartridge cover 19. The ends of the locating posts 94 and 95 have a smooth rounded contour being substantially semi-spherical in shape to provide low interference sliding over the cover bottom side 19B until the cartridge 12 is fully inserted in the tape reader 10. This occurs when the posts 94 and 95 are received by the sides of the locator holes 35 and 36.

Accordingly, the yieldable retaining assemblies 53, 54, 79 and 80 provide four point contact locations of support along the outer side of the cartridge plate 18 to maintain it in aligned position against the base plate 11 on the tape deck. The resilient forces applied by the springs associated with the retainer assemblies through the small point cartridge engaging contacts provided by the rounded spherical shape of the contact surfaces 57 and 58 and of the balls 81 and 82 are effective to hold the cartridge 12 against the base plate 11. These rounded surfaces are further advantageous in providing easy and aligned insertion of the cartridge 12.

A further important feature of this invention is now made by referring FIGS. 1 and 2, and the portion of the tape drive assembly of the tape deck having a pair of identical driving hubs 100 and 101 which are mounted on motor driven spindles. The hubs fit within holes extending through the base plate 11 and the hub 101 is shown in the base plate hole 102. The hub 101 and an associated spindle 103 is shown in the FIG. 2. The driving hubs 100 and 101 each include three driver pins such as pins 105, 106 and 107 shown below a broken away portion of the cartridge 12 and pins 109, 110 and 111 shown in broken lines in FIG. 1 that extend toward the cartridge receiving space. Two of the driver pins 109 and 110 of the driving hub 101 are shown in FIG. 2 as they are mounted in the hub. The pins have diameters of 0.125 in (31.75 mm) in one preferred embodiment. The hubs 100 and 101 are identical and description of the hub 101 is to be understood to be the same for hub 100. The hub 101 includes smaller cylindrical bores 112 and 113 having diameters of 0.129 in (32.7 mm) in one preferred embodiment to have loose clearance relationship with the cylindrical sides of the driver pins 109 and 110. The length of the bores 112 and 113 is short relative to the length of the driver pins, about one-third of the length of the portion of the pins extending through the bores. Enlarged counterbored cylindrical bores 114 and 115 extend from bores 112 and 113 to the opposite end of the hubs. Coil springs 114 and 115 are mounted within each of the counter bores 112 and 113 and held in place by a plate 116 covering the bores 114 and 115. The springs 124 and 125 resiliently urge the drive pins outwardly and are prevented from being pushed out of the driving hub by shoulder portions 117 and 118 of the driver pins.

The diameters of the drive pins provide a loose clearance fit within the bores of the driven reel hubs which have a diameter of 0.165 in. (40.9 mm) in the one preferred embodiment. If the center line 119 of the driven reel hub 24 and the center line 120 of the driving hub are not in coaxial alignment due to dimensional differences due to manufacturing or wear and use, the driver pins are permitted to shift or tilt due to the loose clearance fitting relationship between the driver pins, the associated driving hub bores and the driven reel hub bores. This self-alignment feature is illustrated by the arrangement of the pins 109 and 110 shown in FIG. 2 permitting canting or tilting of the pins when engaging the bore holes 25-1 and 25-2 for transmitting high torque and high speed operation. This assures that the complementary facing driving relationship of the driving hub and the driven hubs provides a coupling which is self-aligning with misalignment between the center lines of the driven and driving hubs. The undesired condition of one of the reel hubs being engaged by a driving hub while the other is not drivenly engaged is substantially avoided. Upon the occurrence of the aforementioned undesired condition, one of the reels would be driven causing the tape 16 not to be properly fed from a supply reel and onto the takeup reel and causing a spillage of tape with excess tape flowing out of the cartridge.

Briefly reviewing the operation of the releasable cartridge mounting of this invention, the cartridge 12 is initially aligned with the side guide plates 50 and 51 for insertion into the tape deck 10. The forward end 19F of the cartridge is tilted inwardly toward and against the base plate 11 as the cartridge bottom side 19B rests against the tops of the posts 94 and 95. The cartridge is pressed forward and upward and easily slides past the rounded cartridge contact surfaces included on the tops of the posts 94 and 95, and of balls 81 and 82 which are biased outward by the cartridge sides. As the forward cartridge end passes under the protrusions 57 and 58 the arms 59 and 60 are biased outward and away from the base plate 11. When the posts 94 and 95 are aligned with the locator holes 35 and 36, the rear cartridge end is released toward the base plate so that the driven reel hubs 23 and 24 are positioned over the driving hubs 100 and 101. The pins 105, 106 and 107 and pins 109, 110 and 111 are resiliently biased into the reel hub holes and are shiftable and tiltable to accommodate fitting into the holes as previously noted. The cartridge bottom is then supported by the base plate 11 upon the catch balls 81 and 82 passing from the cartridge right and left ends to the outer corners thereof. The forward and rear yieldable retainer assemblies resiliently maintain the cartridge bottom side against the base plate so the driven and driving hubs remain coupled together. The posts 94 and 95 maintain the forward cartridge end in the proper forward position relative to the transducer head for playing the tape 16 while the four reference pads 38, 39, 40 and 41 maintain the tape 16 at the proper height from the tape deck for alignment with center of the transducer head along the axis of tape travel.

To remove the cartridge 12, the rear of the cartridge is raised so that the posts 94 and 95 slip out of the locator holes 35 and 36. The arms 61 and 62 of the forward retainer assemblies yieldably move outward and the balls 81 and 82 are biased outward and apart as the right and left hand ends of the cartridge are raised along the inner sides of the guide plates. The rounded cartridge engaging contacts facilitate ease of movement of the cartridge out of the tape deck in the same way that they facilitate insertion of the cartridge.

While the preferred embodiment of the present invention is described, it is to be understood that other alternative embodiments may be made within the spirit and scope of this invention.

We claim:
1. A tape deck including a releasable tape cartridge mounting for a cartridge including a housing having a pair of locator holes in a bottom side thereof, a pair of reels having driven hubs rotatable in the housing with the hubs having circumferentially spaced holes exposed at the bottom side, and a recording tape wound on the reels for movement therebetween, said cartridge mounting comprising:

a base plate having a forward area carrying a tape transducer means, a cartridge support area for supporting said cartridge thereon in a tape playing position within a cartridge receiving space extending rearwardly from said forward area and immediately above said support area;

first and second locating posts extending from a rear area of said base plate for positioning in said locator holes when said cartridge is in said cartridge receiving space a forward yieldable retainer means including arm means having one end movably supported on said forward area and a free end movable toward and away from said cartridge receiving space, two spaced protrusions each having rounded contact surfaces extending from said free end and toward said support area, and resilient means biasing said one end of said arm means toward said base plate such that said free end of the arm means is forced outward by engagement of the protrusions by an outer side of said cartridge housing upon insertion of said cartridge into the cartridge receiving space;

first and second guide plates extending in parallel relationship immediately adjacent opposite sides of said cartridge receiving space; and a rear yieldable retainer means including first and second resiliently biased catch members each having rounded contact surfaces movably mounted in facing relationship at opposite rear portions of said first and second guide plates for movement into and away from the cartridge receiving space, said first and second catch members being forced outwardly by initial insertion of said cartridge along said first and second guide plates and being in engagement with the outer side of said cartridge when said cartridge is received in said cartridge receiving space.

2. A tape deck as claimed in claim 1 wherein said forward yieldable retainer means includes first and second mounting posts and wherein said arm means includes first and second arm members each having one end supported by said first and second mounting posts, respectively, and further wherein said first and second protrusions extend from free ends of said first and second arm members, respectively.

3. A tape deck as claimed in claim 2 wherein said first and second mounting posts include bores, said first and second arm members each include studs extending into said bores, and said resilient means includes first and second coil springs mounted in said bores and about said studs of said first and second arm members so as to bias said studs into said bores.

4. A tape deck as claimed in claim 1 wherein said first and second guide plates each include a recess including a concave ring socket surrounding a hole opening therein receiving one of said first and second catch members so that an inner portion of each of said contact surfaces thereof extends through said hole opening for engaging the cartridge housing at opposite outer corners thereof.

5. A tape deck as claimed in claim 4 wherein first and second spring members are mounted in the recess of said first and second guide plates, respectively, and engage said first and second catch members, respectively, for biasing the catch members through the associated hole opening.

6. A tape deck as claimed in claim 5 wherein said first and second catch members are each formed by a ball rotatable in the associated recess.

7. A tape deck as claimed in claim 1 including a pair of driving hubs drivingly rotated below hole openings in said base plate with said hole openings being aligned with the driven reel hubs of said cartridge when positioned in said cartridge receiving space, each of said pair of driving hubs having plural bore openings having complementary spacing to a corresponding plural number of holes in the driven reel hubs, and a plurality of pin members each slidable and tiltable within one of said bore openings for self-aligning positioning in said holes of said driven reel hubs.

8. A tape deck as claimed in claim 8 including plural coil springs each mounted in said bore openings of said pair of driving hubs and resiliently biasing said pin members outwardly toward said cartridge receiving space.

* * * * *